US012549477B2

(12) United States Patent
Zhang et al.

(10) Patent No.: US 12,549,477 B2
(45) Date of Patent: Feb. 10, 2026

(54) METHOD FOR OBTAINING PATH ASSOCIATION INFORMATION, DEVICE, AND SYSTEM

(71) Applicant: HUAWEI TECHNOLOGIES CO., LTD., Shenzhen (CN)

(72) Inventors: Ka Zhang, Beijing (CN); Zhibo Hu, Beijing (CN); Sheng Fang, Beijing (CN); Ren Tan, Beijing (CN); Hanlin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 18/314,665

(22) Filed: May 9, 2023

(65) Prior Publication Data

US 2023/0283545 A1 Sep. 7, 2023

Related U.S. Application Data

(63) Continuation of application No. PCT/CN2021/110874, filed on Aug. 5, 2021.

(30) Foreign Application Priority Data

Nov. 10, 2020 (CN) .......................... 202011246059.0

(51) Int. Cl.
*H04L 45/00* (2022.01)
(52) U.S. Cl.
CPC .................. *H04L 45/566* (2013.01)
(58) Field of Classification Search
CPC ..... H04L 45/566; H04L 45/645; H04L 45/42; H04L 45/50; H04L 45/56; H04L 45/02;
(Continued)

(56) References Cited

U.S. PATENT DOCUMENTS

2015/0249591 A1 9/2015 Alvarez et al.
2016/0248664 A1* 8/2016 Huang .................... H04L 45/64
(Continued)

FOREIGN PATENT DOCUMENTS

CN 104718730 A 6/2015
CN 109600291 A 4/2019
(Continued)

OTHER PUBLICATIONS

Filsfils et al., "Segment Routing Policy Architecture draft-ietf-spring-segment-routing-policy-08," [online] https://datatracker.ietf.org/doc/draft-ietf-spring-segment-routing-policy, total 35 pages (Jul. 7, 2020).

*Primary Examiner* — Mohamed A Kamara
(74) *Attorney, Agent, or Firm* — Leydig, Voit & Mayer, Ltd.

(57) ABSTRACT

A method for obtaining path association information, a device, and a system are provided, and belong to the field of network technologies. A first network device generates a packet carrying template indication information, and sends the packet to a second network device. After receiving the packet, the second network device determines, based on the template indication information carried in the packet, a target template associated with a target forwarding path, and performs, based on the target template, an operation associated with the target forwarding path. In this way, the first network device may include template indication information corresponding to different templates in a packet, to indicate different receiving network devices to determine a target template associated with a target forwarding path, and determine, based on the target template, association information such as a path attribute or a path constraint associated with the target forwarding path. The path association information is advertised in a manner of carrying the template indication information provided in this method, so that (Continued)

flexibility of obtaining the path association information can be improved without affecting protocol stability.

19 Claims, 6 Drawing Sheets

(58) Field of Classification Search
CPC ......... H04L 45/22; H04L 45/34; H04L 45/38; H04L 41/12; H04L 41/14; H04L 41/0873; H04L 41/0843; H04L 41/0866; H04L 41/0869
See application file for complete search history.

(56) References Cited

U.S. PATENT DOCUMENTS

| | | | |
|---|---|---|---|
| 2021/0250238 A1 | 8/2021 | Nishimoto et al. | |
| 2022/0141095 A1* | 5/2022 | Beeram ................... | H04L 45/50 370/254 |
| 2023/0216780 A1* | 7/2023 | Chen ....................... | H04L 45/00 370/216 |
| 2024/0129246 A1* | 4/2024 | Peng ....................... | H04L 12/46 |

FOREIGN PATENT DOCUMENTS

| | | | | |
|---|---|---|---|---|
| CN | 112054958 A | 12/2020 | | |
| CN | 112106333 A | 12/2020 | | |
| JP | 2020526989 A | 8/2020 | | |
| WO | WO-2014177081 A1 * | 11/2014 | ............. | H04L 45/42 |
| WO | 2019221170 A1 | 11/2019 | | |

* cited by examiner

METHOD FOR OBTAINING PATH ASSOCIATION INFORMATION, DEVICE, AND SYSTEM

CROSS-REFERENCE TO RELATED APPLICATIONS

This application is a continuation of International Application No. PCT/CN2021/110874, filed on Aug. 5, 2021, which claims priority to Chinese Patent Application No. 202011246059.0, filed on Nov. 10, 2020. The disclosures of the aforementioned applications are hereby incorporated by reference in their entireties.

TECHNICAL FIELD

This application relates to the field of network technologies, and in particular, to a method for obtaining path association information, a device, and a system.

BACKGROUND

A communication network usually includes a controller and a plurality of forwarding devices. The controller can calculate a forwarding path based on a network topology of the communication network, and send path information of the forwarding path to a forwarding device on the forwarding path, so that the forwarding device on the forwarding path forwards a service based on the forwarding path.

In an actual forwarding scenario, the forwarding device needs to learn of both the path information of the forwarding path and a path constraint of the forwarding path, so as to perform a related operation. For example, the forwarding device further needs to learn of a bandwidth constraint of the forwarding path, to reserve a bandwidth for the forwarding path based on the bandwidth constraint of the forwarding path. Currently, the controller usually sends the path constraint of the forwarding path to the forwarding device by encapsulating the path constraint of the forwarding path into a packet.

However, during implementation of a current technical solution, various types of path constraints are carried by defining a path constraint field in a protocol. A type of a path constraint required by a forwarding path varies with cases, and types of path constraints usually vary with forwarding paths. Flexibility of carrying a path constraint by defining a path constraint field in a protocol is poor. However, if the path constraint field is frequently modified and supplemented to improve supportability of a protocol standard, stability of the standard is affected, and standard promotion efficiency is low.

SUMMARY

This application provides a method for obtaining path association information, a device, and a system, so that flexibility of obtaining the path association information such as a path attribute or a path constraint can be improved without affecting protocol stability. The technical solutions of this application are as follows:

According to a first aspect, a method for obtaining path association information is provided, and is performed by a first network device. The method includes: generating a packet, where the packet carries template indication information, the template indication information indicates a target template, and the target template is associated with a target forwarding path; and sending the packet to a second network device, so that the second network device performs, based on the target template indicated by the template indication information, an operation associated with the target forwarding path. The second network device may be a device on the target forwarding path. The target template may be associated with the target forwarding path based on association information included in the target template.

According to the technical solution provided in this application, the first network device may include template indication information corresponding to different templates in a packet, to indicate different receiving network devices to determine a target template associated with a target forwarding path, and determine, based on the target template, association information associated with the target forwarding path. The path association information is advertised in a manner of carrying the template indication information provided in the technical solution, so that flexibility of obtaining the path association information can be improved without affecting protocol stability.

Optionally, the target template includes at least one path association attribute and/or at least one path association constraint.

Optionally, the packet further carries path indication information, and the path indication information indicates the target forwarding path. For example, the path indication information may be path information or a path identifier, and the path information may be strict path information or loose path information.

According to the technical solution provided in this application, the path indication information is carried in the packet, so that the second network device can determine the target forwarding path based on the path indication information, to perform the operation associated with the target forwarding path.

Optionally, the method further includes: obtaining at least one template before sending the packet to the second network device, where the target template belongs to the at least one template. For example, the first network device obtains the at least one template based on template configuration information, and the template configuration information may be template configuration information entered by a user into the first network device.

According to the technical solution provided in this application, the first network device obtains the at least one template, so that the first network device determines the target template from the at least one template.

Optionally, the method further includes: sending the at least one template to the second network device before sending the packet to the second network device.

According to the technical solution provided in this application, the first network device sends the at least one template to the second network device, so that the second network device can obtain the at least one template, and in a subsequent operation, the second network device determines, from the at least one template, the target template associated with the target forwarding path.

Optionally, the target template includes at least one of the following: traffic statistics indication information, hot-standby protection indication information, path detection indication information, or path check indication information. The path detection indication information may be bidirectional forwarding detection (BFD) indication information, and the BFD indication information may be specifically seamless bidirectional forwarding detection (SBFD) indication information.

According to a second aspect, a method for obtaining path association information is provided, and is performed by a second network device. The method includes: receiving a packet from a first network device, where the packet carries template indication information; determining a target template based on the template indication information, where the target template is associated with a target forwarding path; and performing, based on the target template, an operation associated with the target forwarding path. The second network device is a device on the target forwarding path. The target template may be associated with the target forwarding path based on association information included in the target template.

According to the technical solution provided in this application, the first network device includes the template indication information corresponding to the target template in the packet, to indicate the second network device to determine the target template associated with the target forwarding path, and determine, based on the target template, association information associated with the target forwarding path. The path association information is advertised in a manner of carrying the template indication information provided in the technical solution, so that flexibility of obtaining the path association information can be improved without affecting protocol stability.

Optionally, the packet further carries path indication information, and the method further includes: determining the target forwarding path based on the path indication information. For example, the path indication information may be path information or a path identifier, and the path information may be strict path information or loose path information.

According to the technical solution provided in this application, the path indication information is carried in the packet, so that the second network device can determine the target forwarding path based on the path indication information, to perform the operation associated with the target forwarding path.

Optionally, the target template includes at least one path association attribute and/or at least one path association constraint.

Optionally, the method further includes: obtaining at least one template before determining the target template based on the template indication information, where the target template belongs to the at least one template. Correspondingly, the determining a target template based on the template indication information includes: determining the target template from the at least one template based on the template indication information. The second network device may obtain the at least one template based on template configuration information, where the template configuration information may be template configuration information entered by a user into the second network device. Alternatively, the second network device may receive the at least one template from the first network device, and the at least one template sent by the first network device to the second network device may be obtained by the first network device based on template configuration information.

According to the technical solution provided in this application, the second network device obtains the at least one template, so that the second network device determines the target template from the at least one template, and performs, based on the target template, the operation associated with the target forwarding path.

Optionally, the target template includes at least one of the following: traffic statistics indication information, hot-standby protection indication information, path detection indication information, or path check indication information. The path detection indication information may be BFD indication information, and the BFD indication information may be specifically SBFD indication information.

Optionally, the performing, based on the target template, an operation associated with the target forwarding path includes: when the target template includes the traffic statistics indication information, collecting traffic statistics on the target forwarding path; when the target template includes the hot-standby protection indication information, switching a forwarding path to a backup path of the target forwarding path if the target forwarding path is faulty; when the target template includes the path detection indication information, detecting whether the target forwarding path is faulty; and when the target template includes the path check indication information, checking connectivity of the target forwarding path based on a network topology.

Optionally, in the first aspect and the second aspect, the target forwarding path includes one of the following: a segment routing traffic engineering (SR-TE) tunnel, a resource reservation protocol-traffic engineering (RSVP-TE) tunnel, or a segment routing policy (SR policy). Based on different tunnel types, this may be implemented through label forwarding based on multiprotocol label switching MPLS), or Internet Protocol version 6 (IPv6) forwarding based on a segment routing over Internet Protocol version 6 (SRv6) segment identifier (a segment list, SID).

Optionally, in the first aspect and the second aspect, the packet is a path computation element communication protocol (PCEP) packet or a border gateway protocol (BGP) packet.

Optionally, in the first aspect and the second aspect, the packet includes a type length value (TLV) field, and the template indication information is in the TLV field.

Optionally, in the first aspect and the second aspect, the template indication information is a template identifier, for example, a template identity (ID).

Optionally, in the first aspect and the second aspect, the first network device is a path computation element (PCE) device, and the second network device is a path computation client (PCC) device.

According to a third aspect, a network device is provided. The network device includes modules configured to perform the method according to any one of the first aspect or the optional manners of the first aspect.

According to a fourth aspect, a network device is provided. The network device includes modules configured to perform the method according to any one of the second aspect or the optional manners of the second aspect.

The modules in the third aspect or the fourth aspect may be implemented based on software, hardware, or a combination of software and hardware, and may be randomly combined or divided based on a specific implementation.

According to a fifth aspect, a network device is provided, including a memory and a processor.

The memory is configured to store a computer program.

The processor is configured to execute the computer program stored in the memory, to enable the network device to perform the method according to any one of the first aspect or the optional manners of the first aspect, or perform the method according to any one of the second aspect or the optional manners of the second aspect.

According to a sixth aspect, a computer-readable storage medium is provided. The computer-readable storage medium stores a computer program. When the computer program is executed by a processor, the method according to any one of the first aspect or the optional manners of the first aspect is implemented, or the method according to any one of the second aspect or the optional manners of the second aspect is implemented.

According to a seventh aspect, a computer program product including instructions is provided. When the computer program product runs on a computer, the computer is enabled to perform the method according to any one of the first aspect or the optional manners of the first aspect, or perform the method according to any one of the second aspect or the optional manners of the second aspect.

According to an eighth aspect, a chip is provided. The chip includes a programmable logic circuit and/or program instructions. When the chip is run, the chip is configured to implement the method according to any one of the first aspect or the optional manners of the first aspect, or implement the method according to any one of the second aspect or the optional manners of the second aspect.

According to a ninth aspect, a communication system is provided, including a first network device and a second network device.

The first network device is the network device according to the third aspect, and the second network device is the network device according to the fourth aspect. Alternatively, at least one of the first network device and the second network device is the network device according to the fifth aspect.

Optionally, the first network device is a PCE device, and the second network device is a PCC device.

The technical solutions provided in this application bring the following beneficial effects.

According to the method for obtaining path association information, the device, and the system provided in this application, the first network device generates a packet carrying template indication information, and sends the packet to the second network device. A target template indicated by the template indication information is associated with a target forwarding path. After receiving the packet, the second network device determines the target template based on the template indication information carried in the packet, and performs, based on the target template, an operation associated with the target forwarding path. In this way, the first network device may include template indication information corresponding to different templates in a packet, to indicate different receiving network devices to determine a target template associated with a target forwarding path, and determine, based on the target template, association information such as a path attribute or a path constraint associated with the target forwarding path. The path association information is advertised in a manner of carrying the template indication information provided in the technical solutions of this application, so that flexibility of obtaining the path association information can be improved without affecting protocol stability.

DESCRIPTION OF EMBODIMENTS

Figure 1:
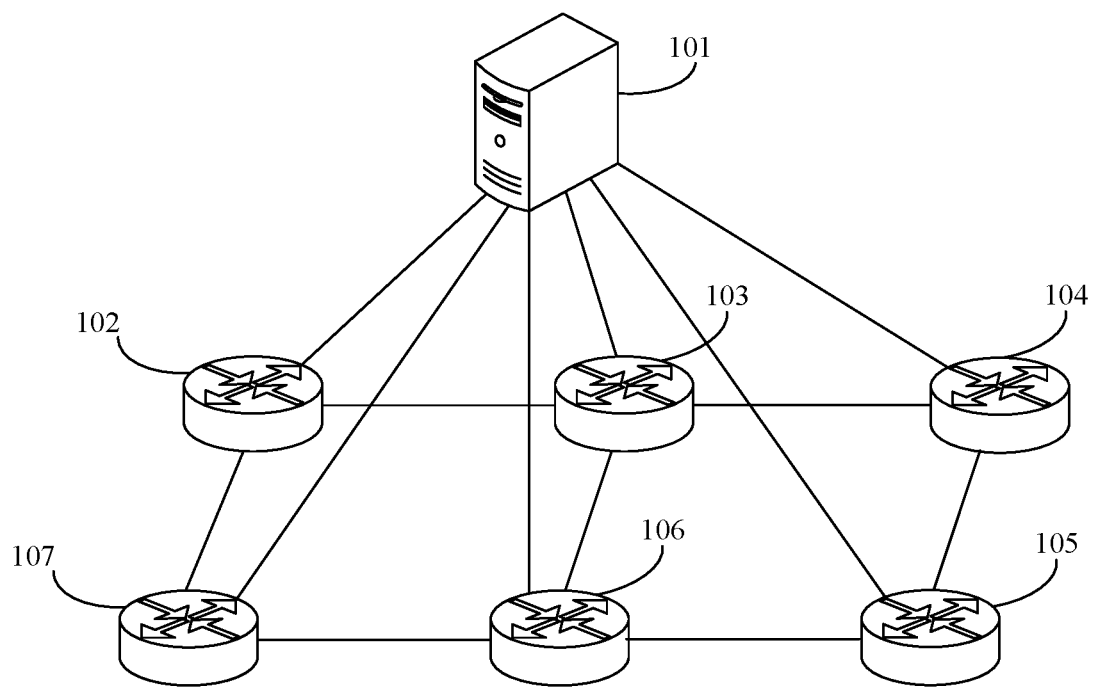
FIG. 1 is a schematic diagram of a communication network according to an embodiment of this application.

To make the principles, technical solutions, and advantages of this application clearer, the following further describes implementations of this application in detail with reference to the accompanying drawings.

The technical solutions provided in embodiments of this application may be applied to a communication network. The communication network may be, for example, a data center network (DCN), a metropolitan area network, a wide area network, or a campus network.

The communication network includes a plurality of network devices. Optionally, the plurality of network devices include at least one control device and a plurality of forwarding devices. The plurality of forwarding devices are communicatively connected, and each forwarding device is communicatively connected to the control device. The control device is configured to control the forwarding device, and the forwarding device is configured to forward a service under control of the control device. The forwarding device may be a device such as a switch, a router, a virtual switch, or a virtual router. In addition, a plurality of forwarding devices in a same communication network may be a same forwarding device, or may be different forwarding devices. For example, all forwarding devices in a same communication network are routers, or some forwarding devices are routers, and the other forwarding devices are switches. The control device may be a controller, for example, may be a terminal, a server, a functional module deployed in a server, a server cluster including several servers, or a cloud computing service center. This is not limited in embodiments of this application.

The control device may compute a forwarding path based on a network topology of the communication network, and send path information of the forwarding path to a forwarding device on the forwarding path. The forwarding device determines the forwarding path based on the received path information, and forwards a service through the determined forwarding path. The forwarding path may include one of an SR-TE tunnel, an RSVP-TE tunnel, or an SR policy. Based on different tunnel types, the forwarding path may be implemented through label forwarding based on MPLS or IPv6 forwarding based on an SRv6 SID. An implementable form of the forwarding path is not limited in embodiments of this application.

According to a service flow direction, forwarding devices on the forwarding path may include an ingress device, an egress device, and a transit device located between the ingress device and the egress device. The control device may send the path information of the forwarding path to the ingress device on the forwarding path, or may send the path information of the forwarding path to another device on the forwarding path. This is not limited in embodiments of this application. The ingress device is a forwarding device (namely, a source forwarding device) located at a source end of the forwarding path, and the egress device is a forwarding device (namely, a destination forwarding device) located at a destination end of the forwarding path. A forwarding device in the communication network may also be referred to as a forwarding node. The ingress device may be referred to as a head node, the egress device may be referred to as an end node, and the transit device may be referred to as a transit node or an intermediate node. It is easy to understand that, based on a length of the forwarding path, only the ingress device and the egress device may exist on the forwarding path, and no transit device exists on the forwarding path. The control device and the forwarding device may communicate with each other based on a BGP or a PCEP. For example, the control device may be a PCE device, the forwarding device (for example, the ingress device) may be a PCC device, and the PCE device and the PCC device communicate with each other based on the PCEP. The PCE device is an entity that can compute a forwarding path based on a network topology, and may be a network node or a server. The PCE device can respond to a path computation request in the communication network, and compute, based on the network topology of the communication network, a forwarding path that meets a constraint. The PCC device is a device that sends the path computation request to the PCE device. Optionally, the PCC sends the path computation request to the PCE device, a PCE application program may be run on the PCE device, and the PCE application program responds to the path computation request, to compute the forwarding path.

In an actual forwarding scenario, the forwarding device on the forwarding path needs to learn of not only the path information of the forwarding path but also a path constraint of the forwarding path, so that the forwarding device on the forwarding path performs a related operation. In this case, the control device may further send the path constraint of the forwarding path to the forwarding device on the forwarding path. For example, the control device sends a bandwidth constraint of the forwarding path to the forwarding device on the forwarding path, and the forwarding device on the forwarding path reserves a bandwidth for the forwarding path based on the bandwidth constraint of the forwarding path.

For example, FIG. 1 is a schematic diagram of a communication network according to an embodiment of this application. The communication network includes network devices 101 to 107. A network device 101 is a control device, and network devices 102 to 107 are all forwarding devices. The network device 101 may compute a forwarding path based on a network topology of the communication network. For example, the forwarding path computed by the network device 101 is a forwarding path S1 (the forwarding path S1 is: network device 102→network device 103→network device 104→network device 105). The network device 101 may send path information of the forwarding path S1 and a path constraint (for example, a bandwidth constraint) of the forwarding path S1 to a network device (for example, the network device 102, which is an ingress device) on the forwarding path S1. The network device 102 determines the forwarding path S1 based on the received path information, and forwards a service through the forwarding path S1 based on the path constraint of the forwarding path S1, for example, reserves a bandwidth for the forwarding path S1 based on the bandwidth constraint of the forwarding path S1.

It is to be noted that the communication network shown in FIG. 1 is merely used as an example, and is not used to limit the technical solutions of embodiments of this application. In a specific implementation process, the communication network may further include another device, and a quantity of control devices and a quantity of forwarding devices may be configured based on a requirement. In addition, a person skilled in the art can understand that in embodiments of this application, an example in which the network device 101 sends the path information of the forwarding path S1 and the path constraint of the forwarding path S1 to the network device 102 (namely, the ingress device) on the forwarding path S1 is used for description. During actual application, the network device 101 may further send the path information of the forwarding path S1 and the path constraint of the forwarding path S1 to the network devices 103 to 105 on the forwarding path S1. This is not limited in embodiments of this application.

Currently, a control device usually encapsulates a path constraint of a forwarding path into a packet, to send the path constraint of the forwarding path to a forwarding device on the forwarding path. For example, the network device 101 encapsulates the path constraint of the forwarding path S1 into a packet, to send the path constraint of the forwarding path S1 to the network device 102. However, in an implementation of carrying a path constraint, a path constraint field needs to be defined in a protocol, to carry different types of path constraint information, for example, bandwidth information. However, a type of a path constraint that needs to be met by a same forwarding path may change, and types of path constraints that need to be met by different forwarding paths may also be different. Therefore, flexibility of carrying a path constraint by defining a path constraint field in the protocol is poor.

In addition, a type of path association information that can be carried and that is provided in a current standard is limited, and is usually a bandwidth constraint or a delay constraint. However, with continuous development of communication network technologies, a network device may be required to support more types of path association information, to implement other management or operations related to a forwarding path.

In view of this, embodiments of this application provide a method for obtaining path association information, a device, and a system. In the technical solutions provided in embodiments of this application, at least one template may be predefined, and each of the at least one template includes corresponding association information (namely, association information corresponding to the template). A first network device may determine a target template in the at least one template as a target template associated with a target forwarding path, encapsulate, in a packet, template indication information indicating the target template, to send the packet to a second network device. The second network device may determine the target template based on the template indication information in the packet, and perform, based on the target template, an operation associated with the target forwarding path. In this way, the first network device may include template indication information corresponding to different templates in a packet, to indicate different receiving network devices to determine association information such as a path attribute or a path constraint associated with a target forwarding path. The path association information is advertised in a manner of carrying the template indication information that is provided in embodiments of this application, so that flexibility of obtaining the path association information can be improved without affecting protocol stability.

In embodiments of this application, both the first network device and the second network device may be control devices (that is, a communication network includes at least two control devices), or one of the first network device and the second network device is a control device, and the other is a path management device. Alternatively, the first network device is a control device, and the second network device is a forwarding device on a target forwarding path, or both the first network device and the second network device are forwarding devices on a target forwarding path. This is not limited in embodiments of this application. In the following descriptions of embodiments of this application, an example in which the first network device is a control device and the second network device is a forwarding device on a forwarding path is used for description.

Figure 2:
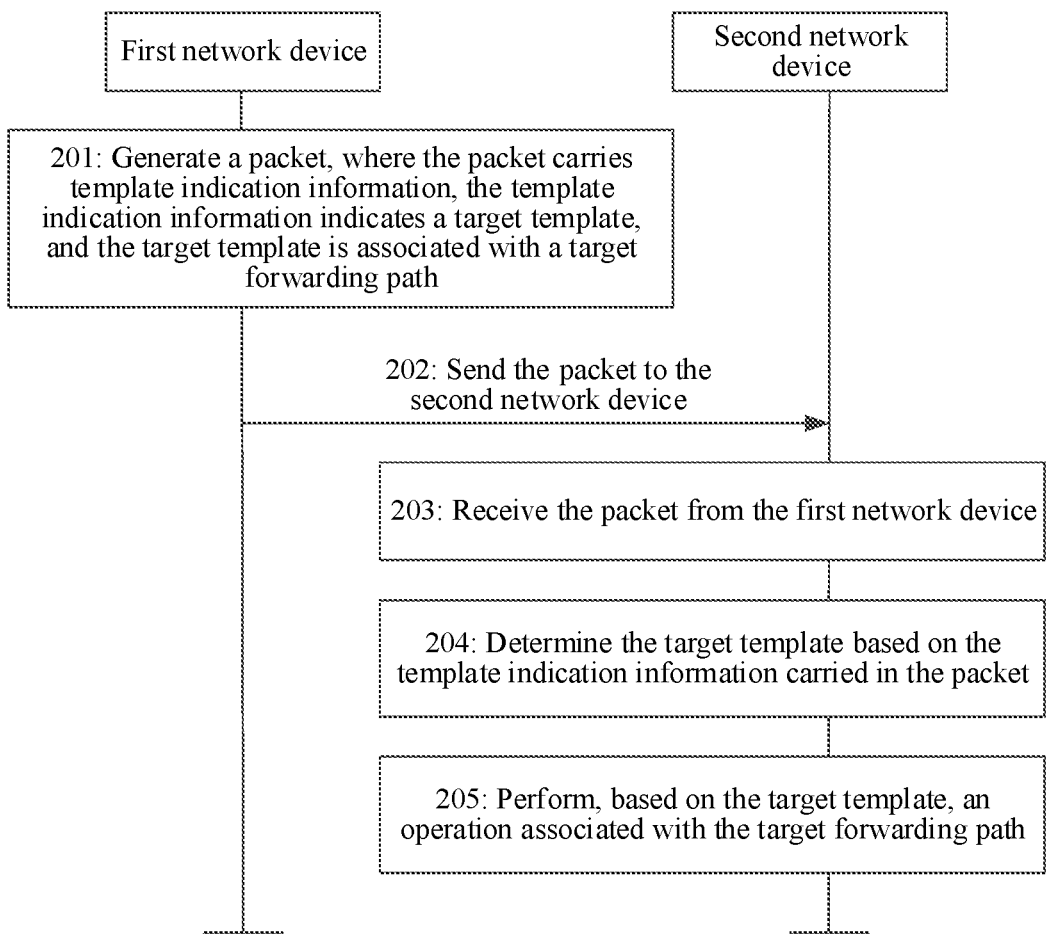
FIG. 2 is a flowchart of a method for obtaining path association information according to an embodiment of this application.

FIG. 2 is a flowchart of a method for obtaining path association information according to an embodiment of this application. The method for obtaining path association information may be applied to the communication network shown in FIG. 1. A first network device described below may be a control device in the communication network, and a second network device is a device on a target forwarding path. For example, the second network device is an ingress device on the target forwarding path. As shown in FIG. 2, the method may include the following several steps.

Step 201: The first network device generates a packet, where the packet carries template indication information, the template indication information indicates a target template, and the target template is associated with the target forwarding path.

Optionally, the first network device may obtain a target template, then determine template indication information of the target template, and generate, based on the template indication information of the target template, a packet that carries the template indication information. The target template is associated with the target forwarding path. For example, the target template includes association information, and the target template is associated with the target forwarding path by using the association information included in the target template. The association information refers to association information associated with the target forwarding path.

Optionally, the association information in this embodiment of this application includes at least one path association attribute and/or at least one path association constraint. The path association attribute may indicate a device to obtain attribute information associated with a forwarding path, such as path attribute information, attribute information of a service carried on the path, and attribute information of a forwarding device on the path. The path association constraint may indicate a constraint that needs to be met by the forwarding path. The constraint that needs to be met herein may be specific to a complete forwarding path, or may be specific to a part of the forwarding path. Optionally, the association information may include at least one of the following: traffic statistics indication information, hot-standby protection indication information, path detection indication information, or path check indication information. The path detection indication information may include BFD indication information, and the BFD indication information may be specifically SBFD indication information. The traffic statistics indication information, the hot-standby protection indication information, the path detection indication information, and the path check indication information may all be used as path association attributes. The association information may further include path association constraints such as a path bandwidth constraint and a path delay constraint. This is not limited in this embodiment of this application.

Indication information (for example, the traffic statistics indication information) included in the association information in this embodiment of this application may be information that mainly has an indication function, which indicates a device receiving the association information to determine, based on the indication information, a path attribute that needs to be obtained, a path constraint that needs to be met, or the like. Optionally, the association information may have an enablement function in addition to the indication function. To be specific, the indication information indicates a device receiving the indication information to first enable a corresponding function, and then perform, based on the indication information, an operation associated with a corresponding forwarding path. In this embodiment of this application, the target template may include at least one of the traffic statistics indication information, the hot-standby protection indication information, the path detection indication information, or the path check indication information. In an example, the traffic statistics indication information in the target template may be traffic statistics enablement information, the hot-standby protection indication information may be hot-standby protection enablement information, the path detection indication information may be path detection enablement information, and the path check indication information may be path detection enablement information. The traffic statistics enablement information indicates a device (for example, the second network device) receiving the target template to first enable a traffic statistics collection function, and then collect traffic statistics on the target forwarding path. The hot-standby protection enablement information indicates the device receiving the target template to first enable a hot-standby protection function, and then perform a hot-standby operation on the target forwarding path. The path detection enablement information indicates the device receiving the target template to first enable a path detection function, and then detect whether the target forwarding path is faulty. The path check enablement information indicates the device receiving the target template to first enable a path check function, and then check connectivity of the target forwarding path.

For example, when the target template includes the traffic statistics enablement information, the hot-standby protection enablement information, and SBFD enablement information, content of the target template may be as follows:

template 100
        traffic-statistics enable
        backup hot-standby enable
        SBFD enable
    "template 100" indicates a template 100, "100" indicates a template identifier of the target template, "traffic-statistics enable" indicates the traffic statistics enablement information, "backup hot-standby enable" indicates the hot-standby protection enablement information, and "SBFD enable" indicates the SBFD enablement information.

Figure 3:
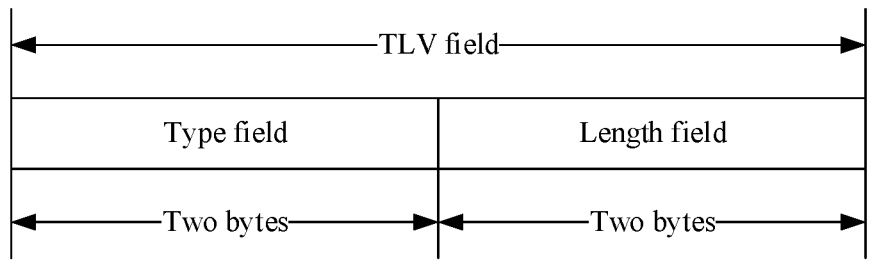
FIG. 3 is a schematic diagram of a TLV field according to an embodiment of this application.
Figure 4:
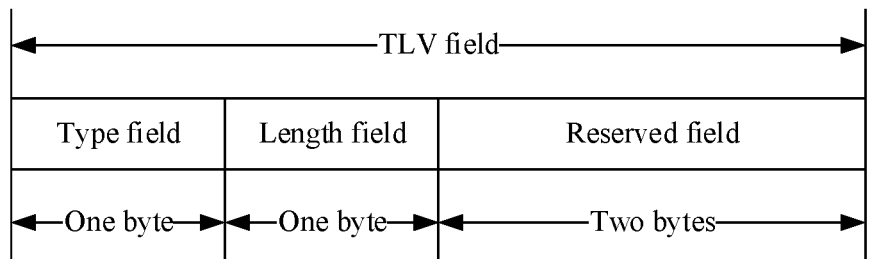
FIG. 4 is a schematic diagram of another TLV field according to an embodiment of this application.

Optionally, the template indication information may be a template identifier, for example, a template ID. Alternatively, the template indication information may be expressed in another manner that can indicate the target template. The packet that carries the template indication information and that is generated by the first network device may be a PCEP packet or a BGP packet. The packet includes a TLV field, and the template indication information is in the TLV field. The TLV field includes at least a type field and a length field, a value in the type field indicates a type of a value in the TLV field, and a value in the length field indicates a length of a value in the TLV field. For example, FIG. 3 and FIG. 4 are schematic diagrams of two TLV fields according to embodiments of this application. As shown in each of FIG. 3 and FIG. 4, the TLV field includes a type field and a length field, and a length of the TLV field is four bytes. As shown in FIG. 3, a length of the type field and a length of the length field in the TLV field each are two bytes. As shown in FIG. 4, the TLV field further includes a reserved field. A length of the type field and a length of the length field in the TLV field each are one byte, and a length of the reserved field is two bytes. Optionally, the TLV field shown in FIG. 3 may be a TLV field in a PCEP packet, the TLV field shown in FIG. 4 may be a TLV field in a BGP packet, and the reserved field in the TLV field shown in FIG. 4 may be used to carry information other than template indication information. This is not limited in embodiments of this application.

Optionally, the target forwarding path in this embodiment of this application may include one of an SR-TE tunnel, an RSVP-TE tunnel, or an SR policy. Based on different tunnel types, the target forwarding path may be implemented through label forwarding based on MPLS or IPv6 forwarding based on an SRv6 SID. In an optional implementation, the packet generated by the first network device may further carry path indication information, where the path indication information indicates the target forwarding path. Optionally, the path indication information may be path information or a path identifier (for example, a path ID). The path information may be strict path information or loose path information. The strict path information indicates a complete target forwarding path. The strict path information may include indication information indicating each network device on the target forwarding path and/or indication information indicating a link between network devices on the target forwarding path. The strict path information may include hop-by-hop forwarding information on the target forwarding path. For example, the strict path information includes indication information of an ingress device, an egress device, and all intermediate devices between the ingress device and the egress device on the target forwarding path, to implement specified hop-by-hop forwarding. The loose path information indicates a key network device on the target forwarding path and/or a link between key network devices. The loose path information may include indication information indicating the key network device on the target forwarding path and/or indication information indicating the link between the key network devices on the target forwarding path. There may be another device between network devices indicated by the indication information in the loose path information, the indicated link is a local link, and so on. In an example, the loose path information indicates an egress device of the target forwarding path, and the loose path information is indication information of the egress device. Another network device on the target forwarding path may be determined by a network device (for example, an ingress device of the target forwarding path) receiving the loose path information through path computation. Alternatively, the network device receiving the loose path information may determine a next-hop network device on the path based on a local routing and forwarding table. Indication information indicating a network device may be an identifier of the network device, for example, may be a SID of the network device. Indication information indicating a link may be an identifier of the link, for example, may be a SID of the link. For example, for the RSVP-TE tunnel, the packet may carry the strict path information; for the SR-TE tunnel, the packet may carry the strict path information or the loose path information; and for the SR policy, the packet may carry the loose path information, for example, path information of a specified head node and end node.

Figure 5:
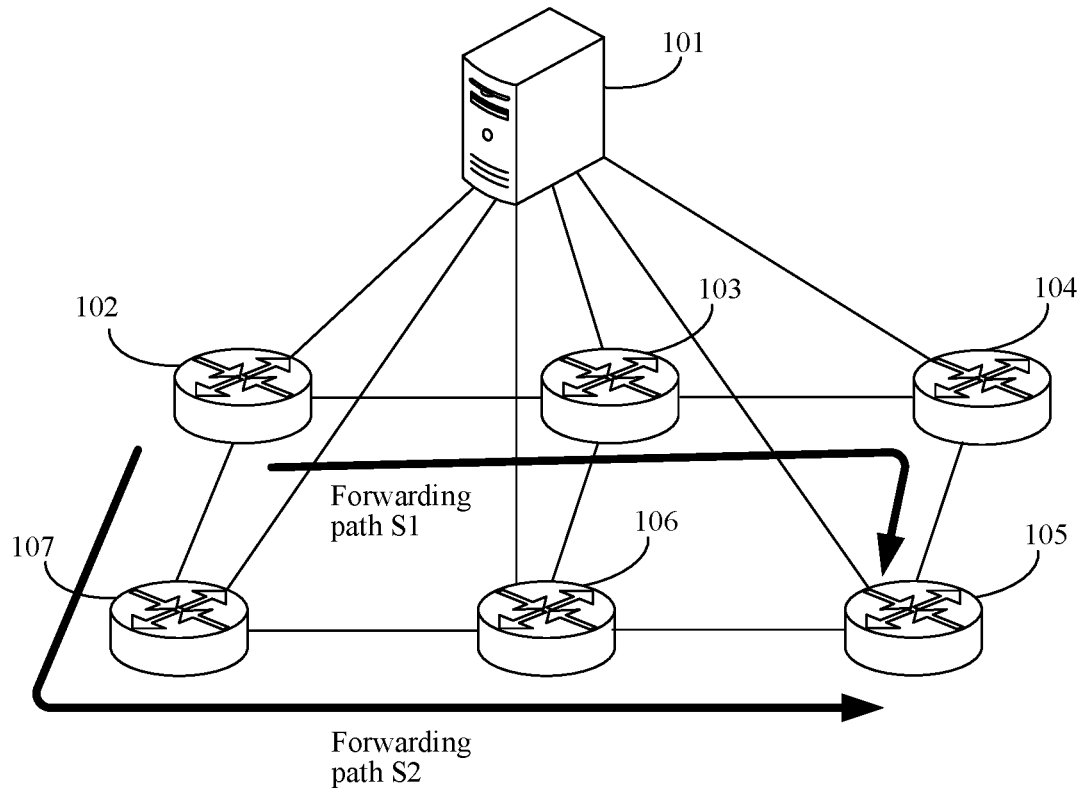
FIG. 5 is a schematic diagram of another communication network according to an embodiment of this application.

For example, FIG. 5 is a schematic diagram of a forwarding path in a communication network according to an embodiment of this application. The communication network includes a forwarding path S1 and a forwarding path S2. The forwarding path S1 and the forwarding path S2 each are a complete path. The forwarding path S1 is: network device 102→network device 103→network device 104→network device 105. The forwarding path S2 is: network device 102→network device 107→network device 106→network device 105. Both an ingress device on the forwarding path S1 and an ingress device on the forwarding path S2 are the network device 102, and both an egress device on the forwarding path S1 and an egress device on the forwarding path S2 are the network device 105. For example, the forwarding path S1 is a target forwarding path. A packet generated by the first network device (for example, the network device 101) may carry path indication information of the forwarding path S1. The path indication information may be a path identifier "S1" of the forwarding path S1 or path information indicating the forwarding path S1. For example, the path information indicating the forwarding path S1 may be strict path information, and the strict path information includes indication information indicating a link between the network devices 102 and 105. Alternatively, the path information indicating the forwarding path S1 may be loose path information. The loose path information includes, for example, indication information indicating the network device 104 and the network device 105 (where it is assumed that the network device 104 and the network device 105 are key network devices on the forwarding path S1) on the forwarding path S1, and/or indication information indicating a link (network device 104→network device 105) between the network device 104 and the network device 105. Alternatively, the loose path information is indication information indicating the network device 105 (namely, the egress device on the forwarding path S1). This is not limited in this embodiment of this application.

In this embodiment of this application, the first network device may obtain the target template from at least one template. It is easy to understand that the target template belongs to the at least one template. That is, the target template is one of the at least one template. Each of the at least one template may have one template identifier, and each of the at least one template includes corresponding association information. The first network device may determine, from the at least one template based on a service requirement, the target template associated with the target forwarding path, obtain the target template, and determine a template identifier of the target template as the template indication information of the target template. The at least one template may be in the first network device or a third-party device (for example, a server). The third-party device may be a device in a communication network in which the first network device is located. This is not limited in this embodiment of this application.

Optionally, the at least one template is in the third-party device (for example, the server). The first network device may obtain the at least one template from the third-party device, and then determine, from the at least one template based on the service requirement, the target template associated with the target forwarding path. Alternatively, optionally, the at least one template is in the first network device, and the at least one template may be generated and prestored by the first network device, for example, through manual configuration or automatic generation. Alternatively, the at least one template may be sent by another network device (for example, the second network device) to the first network device and prestored by the first network device. The first network device may determine, based on the service requirement and from the at least one template prestored by the first network device, the target template associated with the target forwarding path.

For example, the at least one template is generated and prestored by the first network device. The first network device may generate the at least one template based on template configuration information. For example, the first network device may provide a human-machine interaction interface. A user may enter the template configuration information into the first network device through the human-machine interaction interface, and the first network device generates the at least one template based on the template configuration information entered by the user. Alternatively, a user may enter the template configuration information through another human-machine interaction device connected to the first network device, and the first network device obtains the template configuration information from the another human-machine interaction device, and generates the at least one template based on the obtained template configuration information. This is not limited in this embodiment of this application. In an optional implementation, after generating the at least one template, the first network device may send the at least one template to another device in the communication network, so that the another device can perform matching in a subsequent operation based on the template indication information sent by the first network device, to determine the target template from the at least one received template. The at least one template may be sent by using a NETCONF protocol or the like. The another device may include the second network device in this embodiment of this application. To be specific, the first network device may send the at least one template to the second network device. This is not limited in this embodiment of this application.

Step 202: The first network device sends the packet to the second network device.

After generating the packet, the first network device may send the packet to the second network device. The packet carries the template indication information, and the packet may further carry the path indication information.

Step 203: The second network device receives the packet from the first network device.

Step 204: The second network device determines the target template based on the template indication information carried in the packet.

Optionally, the second network device may parse the received packet, extract the template indication information from the packet, and then determine the target template based on the template indication information. In an optional implementation, the second network device determines the target template from the at least one template based on the template indication information. For example, the second network device determines, in the at least one template, a template indicated by the template indication information as the target template. Optionally, the template indication information is a template identifier, and each of the at least one template may have one template identifier. The second network device compares the template identifier carried in the packet with the template identifier of the at least one template, and determines, in the at least one template, a template whose template identifier is the same as the template identifier carried in the packet as the target template. The at least one template may be in the second network device or a third-party device. The third-party device may be a device in a communication network in which the second network device is located. This is not limited in this embodiment of this application.

Optionally, the at least one template is in the third-party device (for example, a server). The second network device may obtain the at least one template from the third-party device, and then determine the target template from the at least one template based on the template indication information. Alternatively, optionally, the at least one template is in the second network device, and the at least one template may be generated and prestored by the second network device, for example, through manual configuration or automatic generation. Alternatively, the at least one template may be sent by another network device (for example, the first network device) to the second network device and prestored by the second network device. The second network device may determine, based on the template indication information, the target template from the at least one template prestored by the second network device.

For example, the at least one template is generated and prestored by the second network device. The second network device may generate the at least one template based on template configuration information. For example, the second network device may provide a human-machine interaction interface. A user may enter the template configuration information into the second network device through the human-machine interaction interface, and the second network device generates the at least one template based on the template configuration information entered by the user. Alternatively, a user may enter the template configuration information through another human-machine interaction device connected to the second network device, and the second network device obtains the template configuration information from the another human-machine interaction device, and generates the at least one template based on the obtained template configuration information. This is not limited in this embodiment of this application. In an optional implementation, after generating the at least one template, the second network device may send the at least one template to another device in the communication network, so that the another device can determine the target template from the at least one received template. The at least one template may be sent by using a NETCONF protocol or the like. The another device may include the first network device in this embodiment of this application. To be specific, the second network device may send the at least one template to the first network device. This is not limited in this embodiment of this application.

For example, step 201 in which the first network device sends the at least one template to the second network device is performed, or step 204 in which the second network device sends the at least one template to the first network device is performed, so that the first network device and the second network device can prestore the at least one same template. In this way, the first network device and the second network device determine the target template based on the at least one template, to determine a path association constraint or a path association attribute associated with the target forwarding path.

Step 205: The second network device performs, based on the target template, an operation associated with the target forwarding path.

Optionally, the second network device obtains association information from the target template, determines the association information in the target template as association information associated with the target forwarding path, and performs a related operation based on the association information in the target template, to perform the operation associated with the target forwarding path. As described in step 201, the association information includes at least one path association attribute and/or at least one path association constraint. The association information may include at least one of the following: traffic statistics indication information, hot-standby protection indication information, path detection indication information, or path check indication information. The path detection indication information may include BFD indication information, and the BFD indication information may be specifically SBFD indication information. The traffic statistics indication information, the hot-standby protection indication information, the path detection indication information, and the path check indication information may all be used as path association attributes. The association information may further include path association constraints such as a path bandwidth constraint and a path delay constraint. In the target template, the path association attribute may indicate a device to obtain attribute information associated with the target forwarding path, and the path association constraint may indicate a constraint that needs to be met by the target forwarding path. The target template may include at least one of the following: traffic statistics indication information, hot-standby protection indication information, path detection indication information, or path check indication information. In addition, the target template may further include path association constraints such as a path bandwidth constraint and a path delay constraint. The second network device may be a network device on the target forwarding path, for example, may be an ingress device on the target forwarding path. In an optional implementation, that the second network device performs, based on the target template, an operation associated with the target forwarding path may include the following four possible cases.

First case: When the target template includes the traffic statistics indication information, traffic statistics is collected on the target forwarding path.

When the second network device determines that the target template includes the traffic statistics indication information, the second network device may enable a traffic statistics collection function, and may collect the traffic statistics on the target forwarding path. For example, the target forwarding path is used for service forwarding. The second network device may collect statistics on a quantity of service packets received by the second network device from a previous-hop device of the second network device on the target forwarding path, to collect statistics on traffic flowing into the second network device, or may collect statistics on a quantity of service packets forwarded by the second network device to a next-hop device of the second network device on the target forwarding path, to collect statistics on traffic flowing out of the second network device.

FIG. 5 is used as an example. For example, the second network device may be the network device 102 shown in FIG. 5, and the target forwarding path is the forwarding path S1 shown in FIG. 5. When the network device 102 determines that a target template includes traffic statistics indication information, the network device 102 collects statistics on a quantity of service packets forwarded by the network device 102 to a network device 103 (namely, a next-hop device of the network device 102 on the forwarding path S1), to collect statistics on traffic flowing out of the network device 102. In this way, traffic statistics is collected on the forwarding path S1. For another example, the second network device may be the network device 103 shown in FIG. 5, and the target forwarding path is the forwarding path S1 shown in FIG. 5. When the network device 103 determines that a target template includes traffic statistics indication information, the network device 103 collects statistics on a quantity of service packets received from a network device 102 (namely, a previous-hop device of the network device 103 on the forwarding path S1), to collect statistics on traffic flowing into the network device 103; or collects statistics on a quantity of service packets forwarded by the network device 103 to a network device 104 (namely, a next-hop device of the network device 103 on the forwarding path S1), to collect statistics on traffic flowing out of the network device 103. In this way, traffic statistics is collected on the forwarding path S1.

Second case: When the target template includes the hot-standby protection indication information, a forwarding path is switched to a backup path of the target forwarding path if the target forwarding path is faulty.

When the second network device determines that the target template includes the hot-standby protection indication information, the second network device may enable a hot-standby protection function, and may determine the backup path of the target forwarding path. The second network device may compute or select an available backup path based on the received hot-standby protection indication information. Alternatively, the second network device may also receive backup path indication information from the first network device, to obtain the backup path. If the target forwarding path is faulty, the second network device switches the forwarding path to the backup path of the target forwarding path. To be specific, in a process of forwarding a service, if the second network device determines that the target forwarding path is faulty, the second network device switches the service from the target forwarding path to the backup path for forwarding. For example, the second network device forwards, to a next-hop device of the second network device on the backup path, a service packet that is supposed to be forwarded to a next-hop device of the second network device on the target forwarding path, to switch a service from the target forwarding path to the backup path for forwarding. A target forwarding path fault may include but is not limited to: The target forwarding path is disconnected (for example, a link between two network devices on the target forwarding path is disconnected), a network device on the target forwarding path is faulty, or a port of a network device on the target forwarding path is faulty. This is not limited in this embodiment of this application.

FIG. 5 is used as an example. For example, the second network device may be the network device 102 shown in FIG. 5, and the target forwarding path is the forwarding path S1 shown in FIG. 5. When the network device 102 determines that a target template includes hot-standby protection indication information, the network device 102 determines that a backup path of the forwarding path S1 may be the forwarding path S2 shown in FIG. 5. If the forwarding path S1 is faulty, the network device 102 forwards, to a network device 107 (namely, a next-hop device of the network device 102 on the forwarding path S2), a service packet that is supposed to be forwarded to a network device 103 (namely, a next-hop device of the network device 102 on the forwarding path S1), to switch a service from the forwarding path S1 to the forwarding path S2 for forwarding.

Optionally, the target forwarding path is computed and sent by the first network device (herein, an example in which the first network device is a control device is used for description) to the second network device. If the first network device determines that a path association attribute of the target forwarding path includes the hot-standby protection indication information, the first network device may send a backup path of the target forwarding path to the second network device when sending the target forwarding path to the second network device. That is, the first network device simultaneously sends two forwarding paths to the second network device. When the second network device determines that the target template includes the hot-standby protection indication information, the second network device may determine one of the two forwarding paths as the target forwarding path, and determine the other forwarding path as the backup path of the target forwarding path. For example, when sending the two forwarding paths to the second network device, the first network device may further send indication information to the second network device to indicate, to the second network device, which forwarding path is a primary path and which forwarding path is the backup path. The second network device determines the primary path as the target forwarding path based on an indication of the first network device, and determines the backup path as the backup path of the target forwarding path. This is not limited in this embodiment of this application. For example, FIG. 5 is used as an example. The first network device may be the network device 101 shown in FIG. 5, the second network device may be the network device 102 shown in FIG. 5, and the target forwarding path is the forwarding path S1 shown in FIG. 5. If the network device 101 determines that a path association attribute of the forwarding path S1 includes hot-standby protection indication information, the network device 101 may send a backup path (for example, a forwarding path S2) of the forwarding path S1 to the network device 102 when sending the forwarding path S1 to the network device 102. In addition, the network device 101 may send indication information to the network device 102 to indicate, to the network device 102, that the forwarding path S1 is a primary path, and the forwarding path S2 is the backup path. When the network device 102 determines that a target template includes the hot-standby protection indication information, the network device 102 determines the forwarding path S1 as the target forwarding path based on an indication of the network device 101, and determines the forwarding path S2 as the backup path of the forwarding path S1. For example, for a target forwarding path in a form of an SR-TE tunnel, the manner of obtaining the backup path may be used.

Optionally, the target forwarding path is computed and sent by the first network device (herein, an example in which the first network device is a control device is used for description) to the second network device. If the first network device determines that a path association attribute of the target forwarding path includes the hot-standby protection indication information, the first network device may send a plurality of forwarding paths including the target forwarding path to the second network device. When the second network device determines that a target template includes the hot-standby protection indication information, the second network device may determine the target forwarding path and a backup path of the target forwarding path from the plurality of forwarding paths. For example, FIG. 5 is used as an example. The first network device may be the network device 101 shown in FIG. 5, the second network device may be the network device 102 shown in FIG. 5, and the target forwarding path is the forwarding path S1 shown in FIG. 5. If the network device 101 determines that a path association attribute of the forwarding path S1 includes hot-standby protection indication information, the network device 101 sends a plurality of forwarding paths including the forwarding path S1 to the network device 102. For example, the network device 101 sends the forwarding path S1, a forwarding path S2, and a forwarding path S3 (for example, the forwarding path S3 is: network device 102→network device 103→network device 106→network device 105) to the network device 102. When the network device 102 determines that a target template includes the hot-standby protection indication information, the network device 102 may determine the target forwarding path and a backup path of the target forwarding path from the plurality of forwarding paths. For example, the network device 102 determines the forwarding path S1 as the target forwarding path, and determines the forwarding path S2 as the backup path of the forwarding path S1. For example, for a target forwarding path in a form of an SR policy tunnel, the manner of obtaining the backup path may be used.

For ease of description, in this embodiment of this application, an example in which "the first network device sends a forwarding path to the second network device" (for example, "the first network device may send, to the second network device, a plurality of forwarding paths including the target forwarding path") is used for description. A person skilled in the art may understand that, during actual application, the first network device may send, to the second network device, path indication information, for example, a path identifier or path information, indicating the forwarding path. This is not limited in this embodiment of this application.

Third case: When the target template includes the path detection indication information, whether the target forwarding path is faulty is detected.

When the second network device determines that the target template includes the path detection indication information, the second network device may enable a path detection function, and may detect whether the target forwarding path is faulty. The path detection indication information may include BFD indication information, and for example, is specifically SBFD indication information, to indicate the second network device to detect, based on a BFD technology, whether the target forwarding path is faulty.

In an example, when the second network device determines that the target template includes the path detection indication information, after enabling the path detection function, the second network device may send a detection packet to an egress device on the target forwarding path, and detect whether a response packet for the detection packet is received within specified duration. If the response packet for the detection packet is received within the specified duration, the target forwarding path is not faulty. Alternatively, if the response packet for the detection packet is not received within the specified duration, the target forwarding path is faulty. Alternatively, although the response packet for the detection packet is received within the specified duration, state information included in the response packet indicates that a fault exists on the target forwarding path. For example, an interface between the egress device and a user side device is faulty. In this case, the target forwarding path is faulty. For example, the second network device may periodically send the detection packet to the egress device of the target forwarding path (that is, the second network device periodically detects whether the target forwarding path is faulty).

For example, FIG. 5 is used as an example. The second network device may be the network device 102 shown in FIG. 5, and the target forwarding path is the forwarding path S1 shown in FIG. 5. When the network device 102 determines that a target template includes BFD indication information, the network device 102 detects, based on a BFD technology, whether the forwarding path S1 is faulty.

Fourth case: When the target template includes the path check indication information, connectivity of the target forwarding path is checked based on a network topology.

When the second network device determines that the target template includes the path check indication information, the second network device may enable a path check function, and may check connectivity of the target forwarding path based on the network topology of a communication network. That is, the second network device determines, based on the network topology of the communication network, whether the target forwarding path is connected. For example, the second network device determines, based on the network topology of the communication network, whether a packet sent by an ingress device (for example, the ingress device may be the second network device) of the target forwarding path can reach a destination device on the target forwarding path. Optionally, the second network device may further determine, based on the network topology of the communication network, whether a packet sent by an egress device of the target forwarding path can reach the ingress device of the target forwarding path. For example, the first network device may also obtain connectivity of a path from the egress device to the ingress device by negotiating and interacting with the second network device, or the like. In other words, the second network device may check unidirectional path connectivity or check bidirectional path connectivity. This is not limited in this embodiment of this application. For example, the target forwarding path may be an SR policy, the ingress device of the target forwarding path may be a head node of the SR policy, and the egress device of the target forwarding path may be an end node of the SR policy. When the head node determines that the target template includes the path check indication information, the head node may determine connectivity of a path from the head node to the end node based on the network topology of the communication network, and determine connectivity of a path from the end node to the head node.

For example, FIG. 5 is used as an example. The second network device may be the network device 102 shown in FIG. 5, and the target forwarding path is the forwarding path S1 shown in FIG. 5. When the network device 102 determines that a target template includes path check indication information, the network device 102 checks connectivity of the forwarding path S1 based on a network topology of a communication network.

The fourth case may also be considered as detecting whether the target forwarding path is faulty. In some implementation scenarios, the fourth case is applicable to checking reachability of the target forwarding path after the target forwarding path is established and before a service is forwarded through the target forwarding path, that is, prechecking whether a packet can be successfully forwarded through the target forwarding path. The third case is applicable to detecting whether the target forwarding path is faulty in a process of forwarding a service through the target forwarding path. This is not limited in this embodiment of this application.

It is easy to understand, based on the foregoing step 201 to step 203, the packet received by the second network device further carries the path indication information, and the path indication information indicates the target forwarding path. In this case, the second network device may further obtain the path indication information by parsing the packet. In an optional implementation, before the foregoing step 205, the method further includes: The second network device determines the target forwarding path based on the path indication information. The target forwarding path may include one of an SR-TE tunnel, an RSVP-TE tunnel, or an SR policy. Based on different tunnel types, the target forwarding path may be implemented through label forwarding based on MPLS or IPv6 forwarding based on an SRv6 SID. The following describes a process in which the second network device determines the target forwarding path based on the path indication information.

Optionally, the path indication information may be path information or a path identifier (for example, a path ID). The path information may be strict path information or loose path information. The strict path information indicates a complete target forwarding path, and the strict path information includes indication information indicating each network device on the target forwarding path and/or indication information indicating a link between network devices on the target forwarding path. The loose path information indicates a key network device on the target forwarding path and/or a link between key network devices, and the loose path information includes indication information indicating the key network device on the target forwarding path and/or indication information indicating the link between the key network devices on the target forwarding path. In an example, the loose path information indicates an egress device of the target forwarding path. Another network device on the target forwarding path is determined by a network device (for example, an ingress device of the target forwarding path) receiving the loose path information through path computation. Alternatively, the network device receiving the loose path information determines a next-hop outbound interface based on local routing information.

In this embodiment of this application, based on different path indication information, implementations in which the second network device determines the target forwarding path based on the path indication information are different. An example in which the path indication information is the path identifier or the path information is used below, to describe two possible implementations of the process in which the second network device determines the target forwarding path.

Implementation 1: The Second Network Device Determines the Target Forwarding Path Based on the Path Identifier.

Optionally, the target forwarding path is an established forwarding path in a communication network. For example, the target forwarding path is a forwarding path that is sent by the first network device (for example, the first network device is a control device) to the second network device in advance. A packet sent by the first network device to the second network device may carry the path identifier of the target forwarding path. The second network device determines a forwarding path that is in the communication network and that is indicated by the path identifier as the target forwarding path.

For example, FIG. 5 is used as an example. The first network device may be the network device 101, the second network device may be the network device 102, and the communication network includes the forwarding path S1 and the forwarding path S2. A packet sent by the network device 101 to the network device 102 carries a path identifier "S1" of the target forwarding path, and the network device 102 determines a forwarding path (namely, the forwarding path S1) that is in the communication network and that is indicated by the path identifier "S1" as the target forwarding path.

Implementation 2: The Second Network Device Determines the Target Forwarding Path Based on the Path Information.

Optionally, a packet sent by the first network device to the second network device may carry strict path information indicating the target forwarding path, and the second network device determines the target forwarding path based on the strict path information indicating the target forwarding path. For example, for a target forwarding path in a form of an RSVP-TE tunnel or an SR-TE tunnel, the manner of obtaining the path may be used. For example, FIG. 5 is used as an example. The first network device may be the network device 101, the second network device may be the network device 102, the communication network includes the forwarding path S1 and the forwarding path S2, and both the forwarding path S1 and the forwarding path S2 may be RSVP-TE tunnels. A packet sent by the network device 101 to the network device 102 carries strict path information "102→103→104→105" indicating the target forwarding path (102, 103, 104, and 105 are successively indication information of the network device 102, indication information of a network device 103, indication information of a network device 104, and indication information of a network device 105, and "→" indicates a link between network devices). A forwarding path indicated by the strict path information is: network device 102→network device 103→network device 104→network device 105. The forwarding path indicated by the strict path information is also the forwarding path S1 in the communication network. Therefore, the network device 102 determines the forwarding path S1 as the target forwarding path.

Optionally, the packet sent by the first network device to the second network device may carry loose path information indicating the target forwarding path, and the second network device determines the target forwarding path based on the loose path information indicating the target forwarding path. Optionally, the second network device determines a key network device on the target forwarding path and/or a link between key network devices based on the loose path information indicating the target forwarding path, and determines a non-key network device on the target forwarding path, a link between non-key network devices, and a link between the non-key network device and the key network device based on a network topology of the communication network through path computation. That is, a network device other than the key network device on the target forwarding path and/or a link other than the link between the key network devices are/is determined by the second network device through path computation. Optionally, the second network device may not perform path computation for a complete path, but forward, based on local routing information and by using an outbound interface on a device, a service packet that carries the loose path information, to indicate that the service packet can be forwarded on a path segment indicated by the loose path information. For example, for a target forwarding path in a form of an SR-TE tunnel or an SR policy, the manner of obtaining the path may be used.

In conclusion, in the method for obtaining path association information according to this embodiment of this application, the first network device generates the packet that carries the template indication information, and sends the packet to the second network device. The target template indicated by the template indication information is associated with the target forwarding path. After receiving the packet, the second network device determines the target template based on the template indication information carried in the packet, and performs, based on the target template, the operation associated with the target forwarding path. In this way, the first network device may include template indication information corresponding to different templates in a packet, to indicate different receiving network devices to determine a target template associated with a target forwarding path, and determine, based on the target template, association information such as a path attribute or a path constraint associated with the target forwarding path. The path association information is advertised in a manner of carrying the template indication information that is provided in this method, so that flexibility of obtaining the path association information can be improved without affecting protocol stability. In the method for obtaining path association information according to this embodiment of this application, the path association information can be conveniently carried between different network devices (for example, a PCE device and a PCC device). Based on this embodiment of this application, if the path association information is subsequently extended, the protocol does not need to be modified.

Figure 6:
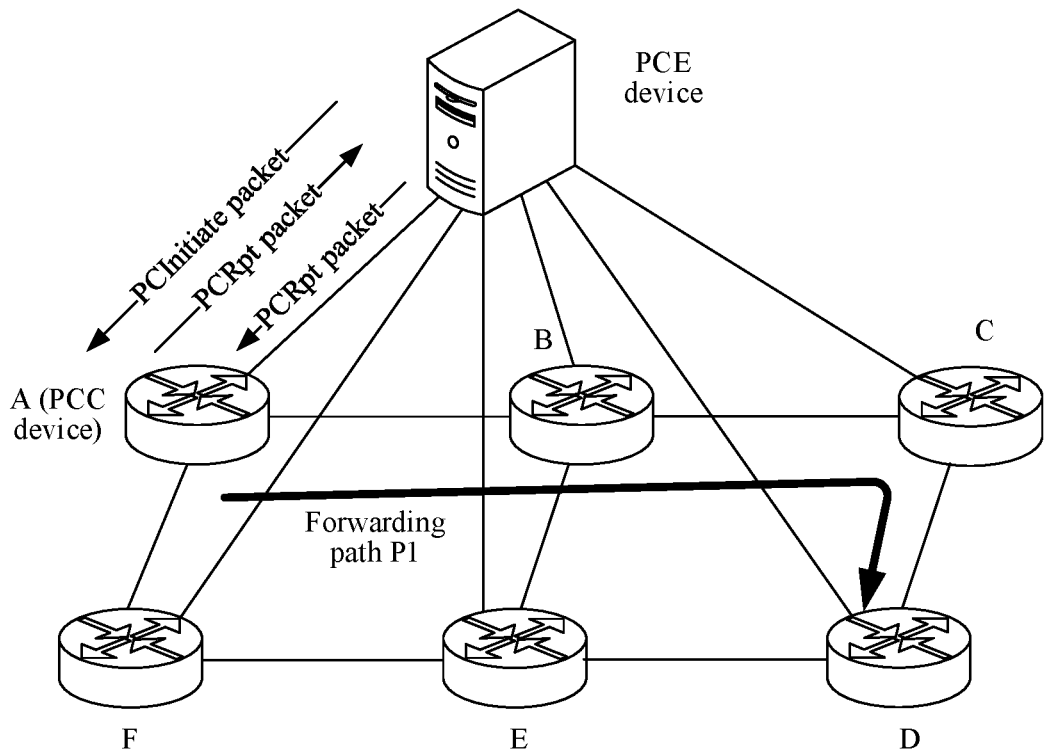
FIG. 6 is a schematic diagram of a method for obtaining path association information according to an embodiment of this application.

In this embodiment of this application, the first network device may be a PCE device, and the second network device may be a PCC device. With reference to FIG. 6 below, a specific example of a method for obtaining path association information according to an embodiment of this application is used for description.

FIG. 6 is a schematic diagram of a method for obtaining path association information according to an embodiment of this application. As shown in FIG. 6, a communication network includes a PCE device and network devices A to F, and the network devices A to F may all be PCC devices. A network device A is a head node of a forwarding path P1 (the forwarding path P1 is: network device A→network device B→network device C→network device D). At least one template is prestored in the PCE device and the PCC device separately, each template includes corresponding association information, and at least one template in the PCE device is the same as at least one template in the network device A (formats of the templates are the same, and association information in the templates is the same). In this embodiment of this application, the path association information may include at least one path association attribute and/or at least one path association constraint. For example, the path association constraint may include a path bandwidth constraint and/or a path delay constraint, and the path association attribute may include at least one of the following: traffic statistics indication information, hot-standby protection indication information, path detection indication information, or path check indication information.

During specific implementation of a process of establishing a forwarding path, the PCE device may first discover PCE members (for example, the PCC devices A to F). After the discovery of the PCE members is completed, the PCE device establishes a session (for example, a PCEP session) with the PCC devices A to F, to exchange information. The PCE device may compute the forwarding path based on service triggering or based on triggering of a path computation request sent by the PCC device (for example, the PCC device A) (the PCC device A may send the path computation request to the PCE device based on user triggering), and send, to the PCC device (for example, the PCC device A), path information indicating the forwarding path. The PCC device establishes the forwarding path based on the path information indicating the forwarding path. For example, the PCE device sends, to the PCC device A, path information indicating the forwarding path P1, and the PCC device A establishes the forwarding path P1 based on the path information indicating the forwarding path P1. The forwarding path that is actively computed by the PCE device based on the service triggering may be referred to as a PCE-initiated (initiated) forwarding path, for example, a PCE-initiated tunnel or a PCE-initiated SR policy.

In this embodiment of this application, the path information indicating the forwarding path may be strict path information or loose path information. For example, for an RSVP-TE tunnel, the path information may be the strict path information; for an SR policy, the path information may be the loose path information; and for an SR-TE tunnel, the path information may be the strict path information or the loose path information. Optionally, for the SR-TE tunnel or the SR policy, the forwarding path may be jointly determined by the PCE device and the PCC device through cooperation. An example in which the PCE device actively computes the forwarding path P1 in FIG. 6 based on the service triggering is used below, to describe two scenarios of the process of establishing the forwarding path P1.

Scenario 1: The PCE Device Actively Computes the Forwarding Path P1 Based on the Service Triggering.

The PCE device determines the path association information (for example, the at least one path association attribute and/or the at least one path association constraint) based on the service triggering and based on a service requirement, and determines a target template from at least one template in the PCE device based on the path association information. The target template includes the at least one path association attribute. In addition, the PCE device computes the forwarding path P1 based on a network topology of the communication network and/or the path association constraint. Then, the PCE device sends a template identifier of the target template and strict path information indicating the forwarding path P1 to the PCC device A by using a path computation label switched path initiate (path computation LSP initiate, PCInitiate) packet.

After receiving the PCInitiate packet, the PCC device A first establishes the forwarding path P1 based on the strict path information that is carried in the PCInitiate packet and that indicates the forwarding path P1, and then sends state information of the forwarding path P1 to the PCE device by using a path computation label switched path state report (path computation LSP state report, PCRpt) packet, to notify the PCE device that the forwarding path P1 is successfully established. Subsequently, if the network topology of the communication network changes, the PCE device may update the forwarding path P1 by using a path computation label switched path update request (path computation LSP update request, PCUpd) packet.

After establishing the forwarding path P1 based on the strict path information that is carried in the PCInitiate packet and that indicates the forwarding path P1, the PCC device A determines, based on the template identifier of the target template carried in the PCInitiate packet, a target template associated with the forwarding path P1 from at least one template in the PCC device A, and performs, based on a path association attribute in the target template, an operation associated with the forwarding path P1. For example, when the target template includes traffic statistics indication information, the PCC device A collects traffic statistics on the forwarding path P1. When the target template includes hot-standby protection indication information, if the forwarding path P1 is faulty, the PCC device A switches a forwarding path to a backup path of the forwarding path P1. When the target template includes path detection indication information, the PCC device A detects whether the forwarding path S1 is faulty. When the target template includes path check indication information, the PCC device A checks connectivity of the forwarding path S1 based on the network topology.

Scenario 2: The PCE Device and the PCC Device Jointly Determine the Forwarding Path P1 Based on the Service Triggering.

The PCE device determines the path association information (for example, the at least one path association attribute and/or the at least one path association constraint) based on the service triggering and based on a service requirement, and determines a target template from at least one template in the PCE device based on the path association information. The target template includes the at least one path association attribute and/or the at least one path association constraint. In addition, the PCE device computes the forwarding path P1 based on a network topology of the communication network and/or the at least one path association constraint. Then, the PCE device sends, to the PCC device A by using a PCInitiate packet, a template identifier of the target template and loose path information indicating the forwarding path P1.

After receiving the PCInitiate packet, the PCC device A first determines, based on the loose path information that is carried in the PCInitiate packet and that indicates the forwarding path P1, a key network device on the forwarding path P1 and/or a link between key network devices, and then determines, based on the template identifier of the target template carried in the PCInitiate packet, a target template associated with the forwarding path P1 from at least one template in the PCC device A.

In a possible implementation, the PCC device A may determine a non-key network device on the forwarding path P1, a link between non-key network devices, and a link between the non-key network device and the key network device through path computation based on the network topology of the communication network and the at least one path association constraint in the target template, then establish the forwarding path P1 based on the key network device on the forwarding path P1, the non-key network device, the link between the key network devices, the link between the non-key network devices, and the link between the non-key network device and the key network device. Then, the PCC device A sends state information of the forwarding path P1 to the PCE device by using a PCRpt packet, to notify the PCE device that the forwarding path P1 is successfully established. Subsequently, if the network topology of the communication network changes, the PCE device may update the forwarding path P1 by using a PCUpd packet, or the PCC device A updates the forwarding path P1 based on a changed network topology. In another possible implementation, the PCC device A determines, based on the received loose path information of the forwarding path P1, a next outbound interface for forwarding a service packet, and includes the loose path information in the service packet, to indicate another device on a target forwarding path to complete forwarding of the service packet based on the loose path information and a local routing table. In this manner, the target forwarding path may be actually dynamically determined in a phase of forwarding the service packet.

The PCC device A may perform, based on a path association attribute in the target template associated with the forwarding path P1, an operation associated with the forwarding path P1. For example, when the target template includes traffic statistics indication information, the PCC device A collects traffic statistics on the forwarding path P1. When the target template includes hot-standby protection indication information, if the forwarding path P1 is faulty, the PCC device A switches a forwarding path to a backup path of the forwarding path P1. When the target template includes path detection indication information, the PCC device A detects whether the forwarding path S1 is faulty. When the target template includes path check indication information, the PCC device A checks connectivity of the forwarding path S1 based on the network topology.

In the foregoing two scenarios, in this embodiment of this application, an example in which the PCE device sends, to the PCC device A in a same packet (for example, the PCInitiate packet), path information indicating the forwarding path P1 and template indication information indicating the target template associated with the forwarding path P1 is used for description. During actual application, the PCE device may send, to the PCC device A by using different packets, the path information indicating the forwarding path P1 and the template indication information indicating the target template associated with the forwarding path P1. For example, the PCE device first sends, to the PCC device A by using the PCInitiate packet, the path information indicating the forwarding path P1, and then sends, to the PCC device A by using another packet, the template indication information indicating the target template associated with the forwarding path P1. Optionally, if the PCE device sends, to the PCC device A by using different packets, the path information indicating the forwarding path P1 and the template indication information indicating the target template associated with the forwarding path P1, the target template may further include a correspondence between the target template and the forwarding path P1 (for example, the target template further includes an ID of the forwarding path P1), to indicate that the target template is associated with the forwarding path P1.

In the foregoing two scenarios, for a process in which the PCE device sends path information of the forwarding path P1 to the PCC device via the PCInitiate packet and updates the forwarding path P1 via the PCUpd packet, refer to the request for comments (RFC) 8281, draft-barth-pce-segment-routing-policy-cp, draft-koldychev-pce-multipath, and draft-ietf-idr-segment-routing-te-policy published by the Internet Engineering Task Force (IETF). The foregoing content is all incorporated in this application by reference.

The following provides apparatus embodiments of this application that may be used to execute the method embodiments of this application. For details not disclosed in the apparatus embodiments of this application, refer to the method embodiments of this application.

Figure 7:
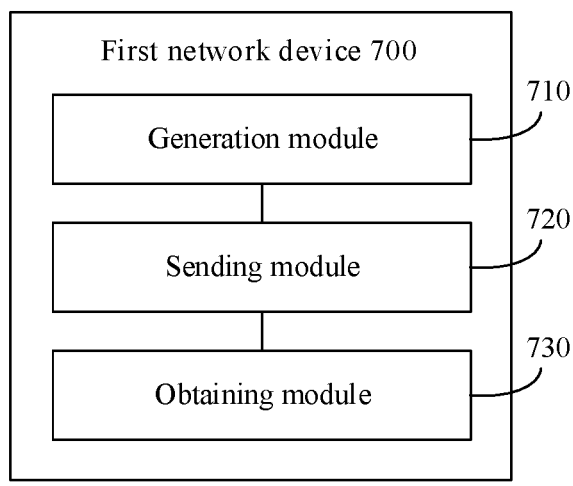
FIG. 7 is a schematic diagram of a logical structure of a first network device according to an embodiment of this application.

FIG. 7 is a schematic diagram of a logical structure of a first network device 700 according to an embodiment of this application. The first network device 700 may be a control device in a communication network. For example, the first network device 700 is a PCE device. Refer to FIG. 7. The first network device 700 may include but is not limited to:

a generation module 710, configured to generate a packet, where the packet carries template indication information, and the template indication information is associated with a target forwarding path, and for implementation of a function of the generation module 710, reference may be made to related descriptions of the foregoing step 201; and a sending module 720, configured to send the packet to a second network device, to enable the second network device to perform, based on a target template indicated by the template indication information, an operation associated with the target forwarding path, where for implementation of a function of the sending module 720, reference may be made to related descriptions of the foregoing step 202.

Optionally, the target template includes at least one path association attribute and/or at least one path association constraint.

Optionally, the packet further carries path indication information, and the path indication information indicates the target forwarding path.

Optionally, still refer to FIG. 7. The first network device 700 further includes: an obtaining module 730, configured to obtain at least one template before the sending module 720 sends the packet to the second network device, where the target template belongs to the at least one template.

Optionally, the sending module 720 is further configured to send the at least one template to the second network device before sending the packet to the second network device.

Optionally, the target template includes at least one of the following: traffic statistics indication information, hot-standby protection indication information, path detection indication information, or path check indication information.

Optionally, the target forwarding path includes one of an SR-TE tunnel, an RSVP-TE tunnel, or an SR policy.

Optionally, the packet is a PCEP packet or a BGP packet.

Optionally, the packet includes a TLV field, and the template indication information is in the TLV field.

Optionally, the template indication information is a template identifier.

Optionally, the second network device is a device on the target forwarding path.

Optionally, the first network device is a PCE device, and the second network device is a PCC device.

In conclusion, based on the first network device according to this embodiment of this application, the first network device generates the packet that carries the template indication information, and sends the packet to the second network device. The target template indicated by the template indication information is associated with the target forwarding path. After receiving the packet, the second network device determines the target template based on the template indication information carried in the packet, and performs, based on the target template, the operation associated with the target forwarding path. In this way, the first network device may include template indication information corresponding to different templates in a packet, to indicate different receiving network devices to determine association information such as a path attribute or a path constraint associated with a target forwarding path. The path association information is advertised in a manner of carrying the template indication information that is provided in this embodiment of this application, so that flexibility of obtaining the path association information can be improved without affecting protocol stability.

Figure 8:
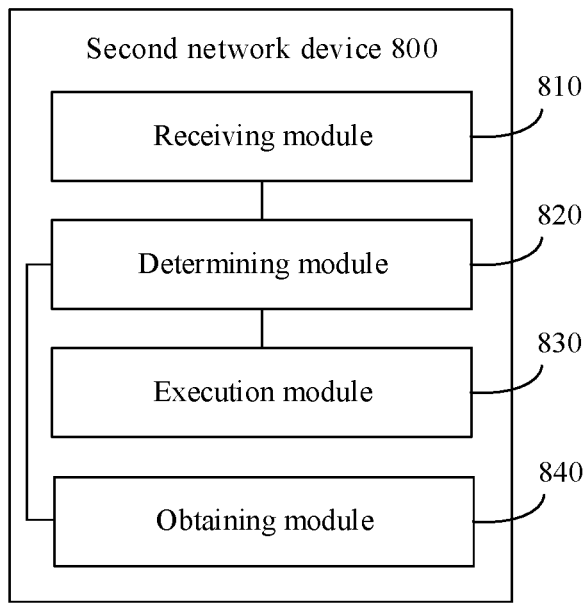
FIG. 8 is a schematic diagram of a logical structure of a second network device according to an embodiment of this application.

FIG. 8 is a schematic diagram of a logical structure of a second network device 800 according to an embodiment of this application. The second network device 800 may be a forwarding device in a communication network. For example, the second network device 800 is a PCC device. Refer to FIG. 8. The second network device 800 may include but is not limited to:

a receiving module 810, configured to receive a packet from a first network device, where the packet carries template indication information, and for implementation of a function of the receiving module 810, reference may be made to related descriptions of the foregoing step 203;

a determining module 820, configured to determine a target template based on the template indication information, where the target template is associated with a target forwarding path, and for implementation of a function of the determining module 820, reference may be made to related descriptions of the foregoing step 204; and an execution module 830, configured to perform, based on the target template, an operation associated with the target forwarding path; where for implementation of a function of the execution module 830, reference may be made to related descriptions of the foregoing step 205.

Optionally, the packet further carries path indication information, and the determining module 820 is further configured to determine the target forwarding path based on the path indication information.

Optionally, the target template includes at least one path association attribute and/or at least one path association constraint.

Optionally, still refer to FIG. 8. The second network device 800 further includes:

an obtaining module 840, configured to obtain at least one template before the determining module 820 determines the target template based on the template indication information, where the target template belongs to the at least one template.

The determining module 820 is configured to determine the target template from the at least one template based on the template indication information.

Optionally, the target template includes at least one of the following: traffic statistics indication information, hot-standby protection indication information, path detection indication information, or path check indication information.

Optionally, the execution module 830 is configured to:

when the target template includes the traffic statistics indication information, collect traffic statistics on the target forwarding path;

when the target template includes the hot-standby protection indication information, switch a forwarding path to a backup path of the target forwarding path if the target forwarding path is faulty;

when the target template includes the path detection indication information, detect whether the target forwarding path is faulty; and when the target template includes the path check indication information, check connectivity of the target forwarding path based on a network topology.

Optionally, the target forwarding path includes one of an SR-TE tunnel, an RSVP-TE tunnel, or an SR policy.

Optionally, the packet is a PCEP packet or a BGP packet.

Optionally, the packet includes a TLV field, and the template indication information is in the TLV field.

Optionally, the template indication information is a template identifier.

Optionally, the second network device is a device on the target forwarding path.

Optionally, the first network device is a PCE device, and the second network device is a PCC device.

In conclusion, based on the second network device according to this embodiment of this application, the second network device receives, from the first network device, the packet that carries the template indication information. The target template indicated by the template indication information is associated with the target forwarding path. After receiving the packet, the second network device determines the target template based on the template indication information carried in the packet, and performs, based on the target template, the operation associated with the target forwarding path. In this way, the first network device includes the template indication information corresponding to the target template in the packet, to indicate the second network device to determine the target template associated with the target forwarding path, and determine, based on the target template, association information associated with the target forwarding path. The path association information is advertised in a manner of carrying the template indication information that is provided in this embodiment of this application, so that flexibility of obtaining the path association information can be improved without affecting protocol stability.

It can be understood that the network device in this embodiment of this application may further be implemented by using an application-specific integrated circuit (ASIC) or a programmable logic device (PLD). The PLD may be a complex programmable logic device (CPLD), a field programmable gate array (FPGA), a generic array logic (GAL), or any combination thereof. The method for obtaining path association information provided in the foregoing method embodiments may also be implemented by using software. When the method for obtaining path association information provided in the foregoing method embodiments is implemented by using software, each module in the network device may alternatively be a software module.

Figure 9:
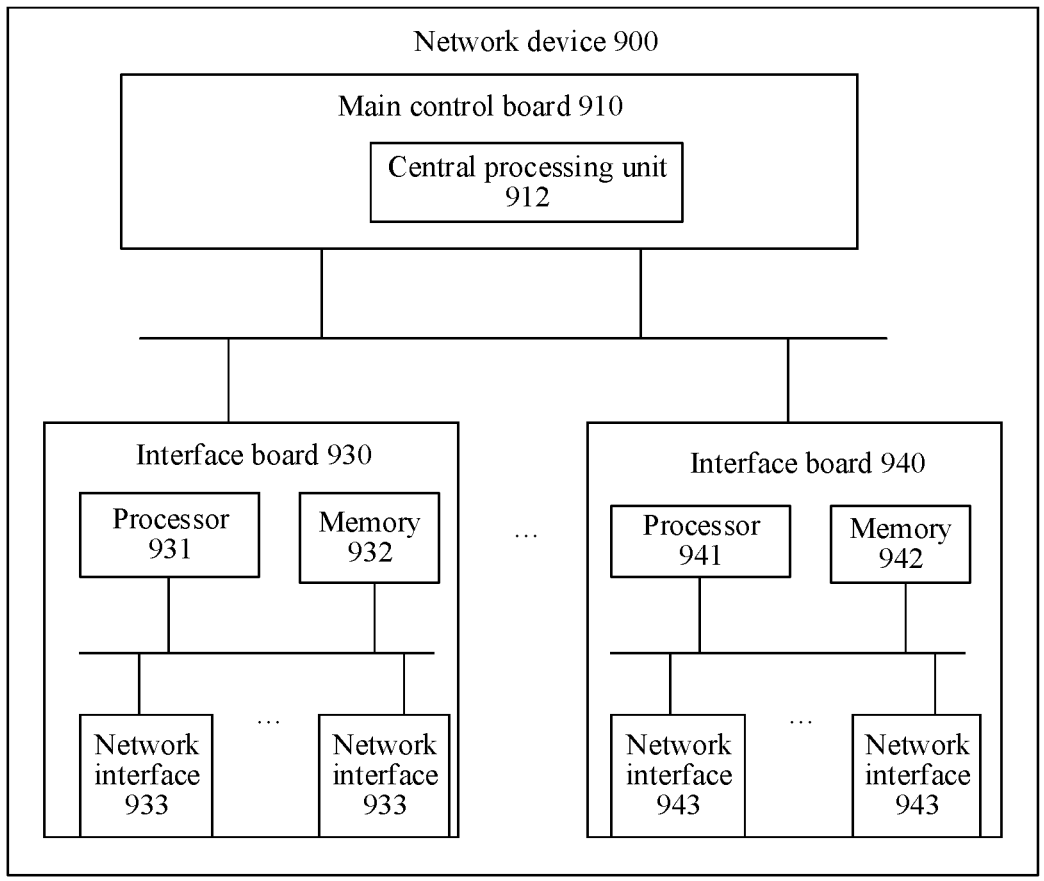
FIG. 9 is a schematic diagram of a hardware structure of a network device according to an embodiment of this application.

FIG. 9 is a schematic diagram of a hardware structure of a network device 900 according to an embodiment of this application. The network device 900 may be the first network device or the second network device in the foregoing embodiments. As shown in FIG. 9, the network device 900 includes: a main control board 910, an interface board 930, and an interface board 940. When there are a plurality of interface boards, a switching board (not shown in the FIG. 9) may be included. The switching board is configured to complete data exchange between the interface boards (the interface board is also referred to as a line card or a service board).

The main control board 910 is configured to complete functions such as system management, device maintenance, and protocol processing. The interface board 930 and the interface board 940 are configured to provide various service interfaces (for example, a POS interface, a GE interface, and an ATM interface), and implement packet forwarding. The main control board 910 mainly includes three types of function units: a system management and control unit, a system clock unit, and a system maintenance unit. The main control board 910, the interface board 930, and the interface board 940 are connected to a system backboard through a system bus to implement interworking. The interface board 930 includes one or more processors 931. The processor 931 is configured to control and manage the interface board, and communicate with a central processing unit on the main control board. A memory 932 on the interface board 930 is configured to store at least one template. The processor 931 determines, by searching for the at least one template stored in the memory 932, a target template associated with a target forwarding path, and performs, based on the target template, an operation associated with the target forwarding path.

The interface board 930 includes one or more network interfaces 933, configured to receive a packet carrying template indication information. The processor 931 determines, based on the template indication information carried in the packet received by the network interface 933, the target template associated with the target forwarding path. A specific implementation process is not described herein again. Specific functions of the processor 931 are not described one by one herein again either.

It may be understood that, as shown in FIG. 9, in this embodiment, the plurality of interface boards are included, and a distributed forwarding mechanism is used. In this mechanism, operations on the interface board 940 are basically similar to operations on the interface board 930. For brevity, details are not described again. In addition, it may be understood that the processor 931 on the interface board 930 and/or a processor 941 on the interface board 940 in FIG. 9 may be dedicated hardware or a chip, for example, a network processor or an application-specific integrated circuit, to implement the foregoing functions. This implementation is generally referred to as a manner of using dedicated hardware or a chip for processing on a forwarding plane. In another implementation, the processor 931 on the interface board 930 and/or the processor 941 on the interface board 940 may alternatively use a general-purpose processor, for example, a general-purpose central processing unit (CPU), to implement the functions described above.

In addition, it is to be noted that there may be one or more main control boards, and when there are a plurality of main control boards, the main control boards may include a primary main control board and a standby main control board. There may be one or more interface boards. A network device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the network device may not need the switching board, and the interface board provides a function of processing service data of an entire system. In a distributed forwarding architecture, the network device includes a plurality of interface boards. Data exchange between the plurality of interface boards may be implemented by using a switching board, to provide a large-capacity data exchange and processing capability. Therefore, a data access and processing capability of a network device in the distributed architecture is better than that of a device in the centralized architecture. A specific architecture that is to be used depends on a specific networking deployment scenario. This is not limited herein.

In a specific embodiment, the memory 932 may be a read-only memory (ROM) or another type of static storage device that can store static information and instructions, or a random access memory (RAM) or another type of dynamic storage device that can store information and instructions. The memory 932 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk or another magnetic storage device, or any other medium that can be used to carry or store expected program code in a form of instructions or a data structure and that can be accessed by a computer. However, the memory 932 is not limited thereto. The memory 932 may exist independently, and is connected to the processor 931 through a communication bus. Alternatively, the memory 932 and the processor 931 may be integrated together.

The memory 932 is configured to store program code, and the processor 931 controls execution of the program code, to execute some or all of the steps of the method for obtaining path association information provided in the foregoing embodiments. The processor 931 is configured to execute the program code stored in the memory 932. The program code may include one or more software modules. The one or more software modules may be the functional modules provided in any embodiment in FIG. 7 and FIG. 8.

In a specific embodiment, the network interface 933 may be any transceiver-type apparatus, and is configured to communicate with another device or a communication network, for example, the Ethernet, a radio access network (RAN), or a wireless local area network (WLAN).

Figure 10:
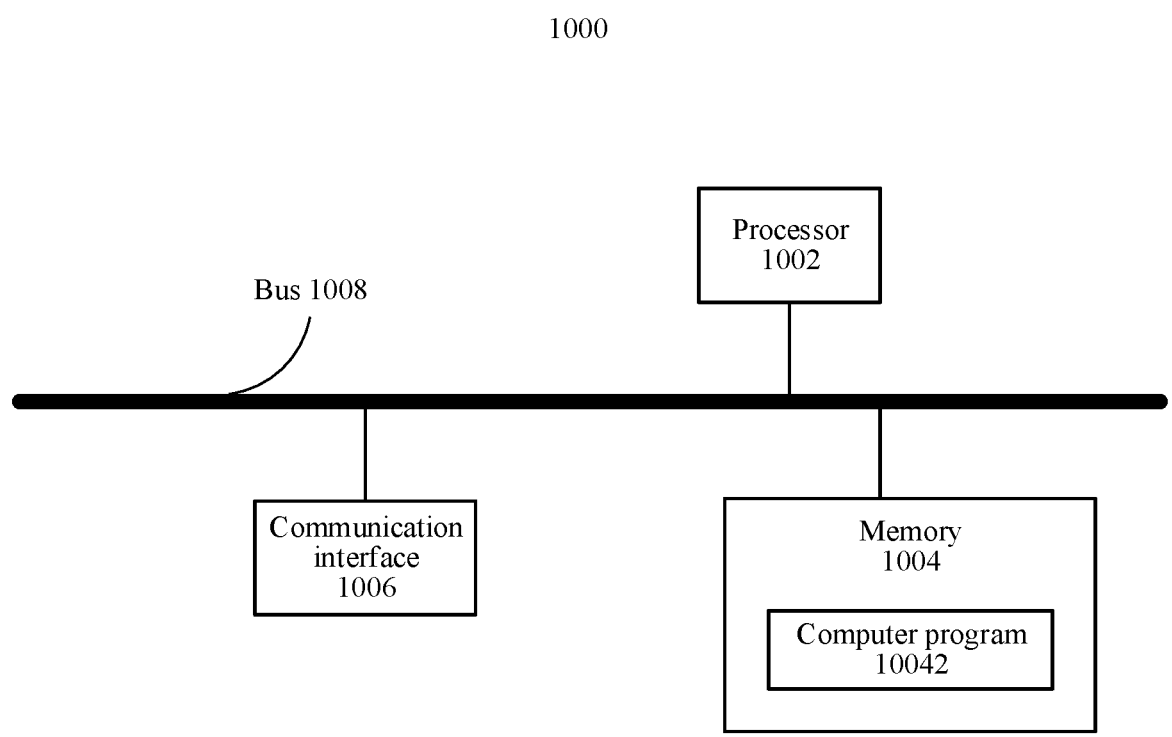
FIG. 10 is a schematic diagram of a hardware structure of another network device according to an embodiment of this application.

FIG. 10 is a schematic diagram of a hardware structure of another network device 1000 according to an embodiment of this application. The network device 1000 may be the first network device or the second network device in any one of the foregoing embodiments. Refer to FIG. 10. The network device 1000 includes a processor 1002, a memory 1004, a communication interface 1006, and a bus 1008. The processor 1002, the memory 1004, and the communication interface 1006 are communicatively connected to each other by using the bus 1008. A person skilled in the art can understand that a connection manner between the processor 1002, the memory 1004, and the communication interface 1006 shown in FIG. 10 is merely an example. In an implementation process, the processor 1002, the memory 1004, and the communication interface 1006 may alternatively be communicatively connected with each other in another connection manner other than using the bus 1008.

The memory 1004 may be configured to store a computer program 10042. The computer program 10042 may include instructions and data. In this embodiment of this application, the memory 1004 may be various types of storage media, for example, a RAM, a ROM, a non-volatile RAM (NVRAM), a programmable ROM (programmable ROM, PROM), an erasable PROM (EPROM), an electrically erasable PROM (EEPROM), a flash memory, an optical memory, and a register. In addition, the memory 1004 may include a hard disk and/or an internal storage.

The processor 1002 may be a general-purpose processor. The general-purpose processor may be a processor that reads and executes a computer program (for example, the computer program 10042) stored in a memory (for example, the memory 1004) to perform a specific step and/or operation. In a process of performing the foregoing steps and/or operations, the general-purpose processor may use data stored in the memory (for example, the memory 1004). For example, the stored computer program may be executed to implement related functions of the generation module 710, the obtaining module 730, the determining module 820, the execution module 830, and the obtaining module 940. The general-purpose processor may be, for example, but not limited to, a CPU. In addition, the processor 1002 may alternatively be a dedicated processor. The dedicated processor may be a processor specially designed to perform a specific step and/or operation. The dedicated processor may be, for example, but not limited to, a digital signal processor (DSP), an ASIC, an FPGA, or the like. In addition, the processor 1002 may alternatively be a combination of a plurality of processors, for example, a multi-core processor.

The processor 1002 may include at least one circuit, to perform all or some of the steps of the method for obtaining path association information provided in the foregoing embodiments.

The communication interface 1006 may include an interface that is used to implement interconnection of components inside the network device 1000, for example, an input/output (I/O) interface, a physical interface, or a logical interface, and an interface that is used to implement interconnection between the network device 1000 and another device (for example, a network device or user equipment). The physical interface may be a gigabit Ethernet (GE) interface, and may be configured to implement interconnection between the network device 1000 and another device (for example, a network device or user equipment). The logical interface is an interface inside the network device 1000, and the logical interface may be configured to implement interconnection of components inside the network device 1000. It is easy to understand that the communication interface 1006 may be used by the network device 1000 to communicate with another network device and/or user equipment. For example, the communication interface 1006 is used for packet sending and receiving between the network device 1000 and another network device. The communication interface 1006 may implement related functions of the sending module 720 and the receiving module 810.

The bus 1008 may be any type of communication bus, for example, a system bus, configured to implement interconnection between the processor 1002, the memory 1004, and the communication interface 1006.

The foregoing components may be separately disposed on chips that are independent of each other, or at least some or all of the components may be disposed on a same chip. Whether the components are separately disposed on different chips or integrated and disposed on one or more chips usually depends on a requirement of a product design. This embodiment of this application imposes no limitation on specific implementations of the foregoing components.

The network device 1000 shown in FIG. 10 is merely an example. In an implementation process, the network device 1000 may further include other components, which are not enumerated one by one in this specification. The network device 1000 shown in FIG. 10 may obtain, by performing all or some steps of the method for obtaining path association information provided in the foregoing embodiments, association information associated with a forwarding path.

An embodiment of this application provides a computer-readable storage medium. The computer-readable storage medium stores a computer program. When the computer program is executed by a processor, all or some of the steps of the method for obtaining path association information provided in the foregoing method embodiments are implemented.

An embodiment of this application provides a computer program product including instructions. When the computer program product runs on a computer, the computer is enabled to perform all or some of the steps of the method for obtaining path association information provided in the foregoing method embodiments.

An embodiment of this application provides a chip. The chip includes a programmable logic circuit and/or program instructions. When the chip is run, the chip is configured to implement all or some of the steps in the method for obtaining path association information provided in the foregoing method embodiments.

An embodiment of this application further provides a communication system. The communication system includes a first network device and a second network device. The first network device may be the first network device shown in FIG. 7, and the second network device may be the second network device shown in FIG. 8. Alternatively, at least one of the first network device and the second network device may be the network device shown in FIG. 9 or FIG. 10. Optionally, the first network device is a PCE device, and the second network device is a PCC device.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", "third", "fourth", and the like are merely used for a purpose of description, and cannot be understood as an indication or implication of relative importance. The term "at least one" refers to one or more, and "a plurality of" refers to two or more. Unless otherwise specified, the term "at least one" is similar thereto. The term "and/or" describes only an association relationship between associated objects and indicates that there may be three relationships. For example, A and/or B may represent the following three cases: Only A exists, both A and B exist, and only B exists. In addition, the character "/" in this specification generally indicates an "or" relationship between the associated objects.

For different types of embodiments such as the method embodiment and the apparatus embodiment provided in embodiments of this application, refer to each other. This is not limited in embodiments of this application. A sequence of the operations of the method embodiment provided in embodiments of this application can be properly adjusted, and the operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it can be understood that the disclosed apparatus and the like may be implemented in other composition manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or another form.

The units described as separate parts may or may not be physically separate, and parts described as units may or may not be physical units, that is, may be located at one position, or may be distributed on a plurality of network devices (for example, terminal devices). Some or all of the units may be selected based on actual requirements to achieve the objectives of the solutions of embodiments.

The foregoing descriptions are merely example implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining path association information, performed by a first network device, wherein the method comprises:
    determining, from at least one template based on a service requirement, a target template associated with a target forwarding path;
    obtaining the target template;
    determining template indication information of the target template, wherein the template indication information indicates the target template;
    generating a packet, wherein the packet carries the template indication information; and
    sending the packet to a second network device, wherein the second network device performs, based on the target template indicated by the template indication information, an operation associated with the target forwarding path.

2. The method according to claim 1, wherein the target template comprises at least one path association attribute and path association constraint.

3. The method according to claim 1, wherein the packet further carries path indication information, and the path indication information indicates the target forwarding path.

4. The method according to claim 1, wherein the method further comprises:
    obtaining at least one template before sending the packet to the second network device, wherein the target template belongs to the at least one template.

5. The method according to claim 1, wherein the target template comprises at least one of the following: traffic statistics indication information, hot-standby protection indication information, path detection indication information, or path check indication information.

6. A method for obtaining path association information, performed by a second network device, wherein the method comprises:
    receiving a packet from a first network device, wherein the packet carries template indication information that was determined based on a service requirement;
    determining a target template based on the template indication information, wherein the target template is associated with a target forwarding path; and
    performing, based on the target template, an operation associated with the target forwarding path.

7. The method according to claim 6, wherein the packet further carries path indication information, and the method further comprises:
    determining the target forwarding path based on the path indication information.

8. The method according to claim 6, wherein the target template comprises at least one path association attribute and path association constraint.

9. The method according to claim 6, wherein the method further comprises:
    obtaining at least one template before determining the target template based on the template indication information, wherein the target template belongs to the at least one template; and
    the determining a target template based on the template indication information comprises: determining the target template from the at least one template based on the template indication information.

10. The method according to claim 6, wherein the target template comprises at least one of the following: traffic statistics indication information, hot-standby protection indication information, path detection indication information, or path check indication information.

11. The method according to claim 10, wherein the performing, based on the target template, an operation associated with the target forwarding path comprises:
    when the target template comprises the traffic statistics indication information, collecting traffic statistics on the target forwarding path;
    when the target template comprises the hot-standby protection indication information, switching a forwarding path to a backup path of the target forwarding path if the target forwarding path is faulty;
    when the target template comprises the path detection indication information, detecting whether the target forwarding path is faulty; and
    when the target template comprises the path check indication information, checking connectivity of the target forwarding path based on a network topology.

12. The method according to any one of claim 6, wherein the target forwarding path comprises one of the following: a segment routing traffic engineering SR-TE tunnel, a resource reservation protocol traffic-engineering RSVP-TE tunnel, or a segment routing policy SR policy.

13. The method according to claim 6, wherein the packet is a path computation element communication protocol PCEP packet or a border gateway protocol BGP packet.

14. The method according to claim 6, wherein the packet comprises a type length value TLV field, and the template indication information is in the TLV field.

15. The method according to claim 6, wherein the template indication information is a template identifier.

16. The method according to claim 6, wherein the second network device is a device on the target forwarding path.

17. The method according to claim 6, wherein the first network device is a path computation element PCE device, and the second network device is a path computation client PCC device.

18. A first network device, wherein the first network device comprises:
   a processor; and
   a non-transitory memory storing instructions, that when executed by the processor, cause the first network device to perform steps comprising:
   determining, from at least one template based on a service requirement, a target template associated with a target forwarding path;
   obtaining the target template;
   determining template indication information of the target template, wherein the template indication information indicates the target template;
   generating a packet, wherein the packet carries the template indication information; and
   sending the packet to a second network device, wherein the second network device performs, based on the target template indicated by the template indication information, an operation associated with the target forwarding path.

19. The first network device according to claim 18, wherein
   the target template comprises at least one path association attribute and path association constraint.

\* \* \* \* \*